S. WEINBERG.
APPARATUS FOR MAKING GRAPE JUICE.
APPLICATION FILED JAN. 26, 1916.
1,196,621. Patented Aug. 29, 1916.
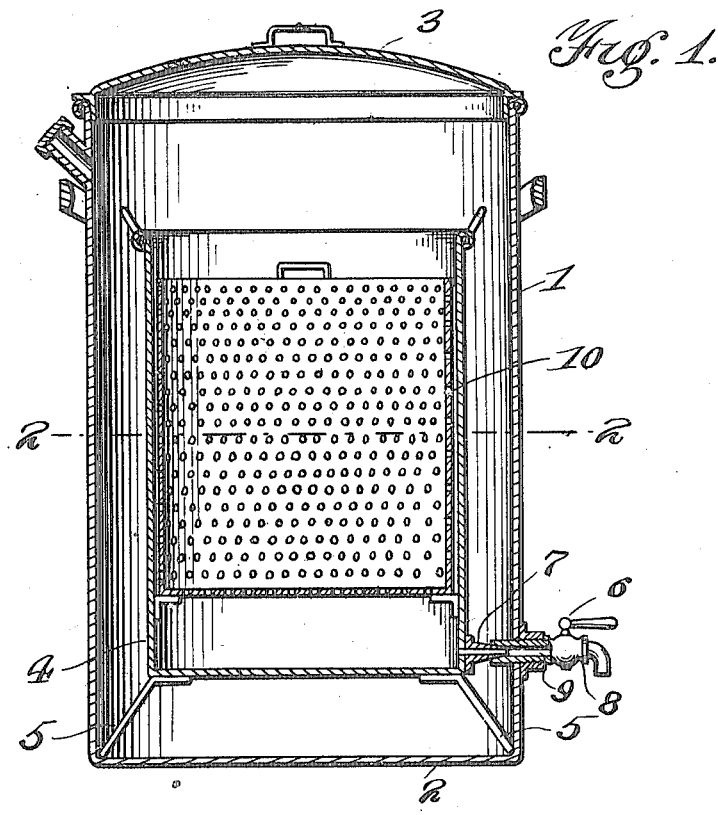
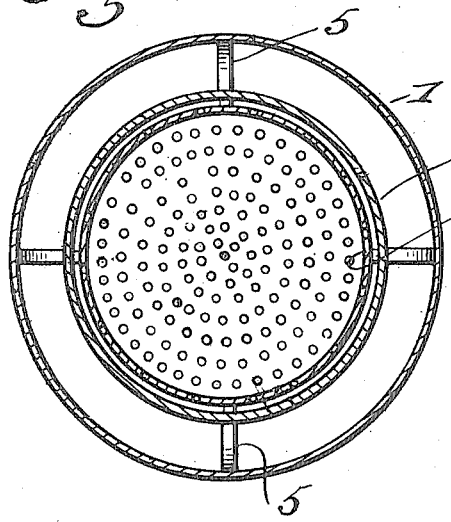
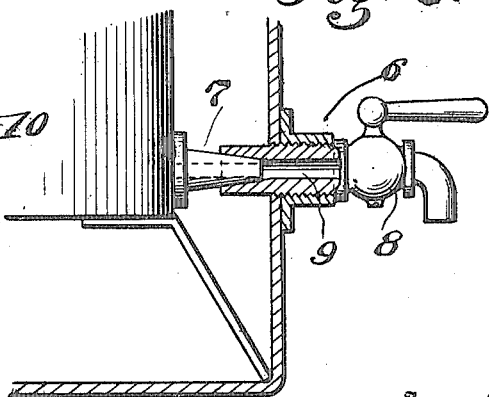
Witnesses
Inventor
Solomon Weinberg
By Victor J. Evans
Attorney

UNITED STATES PATENT OFFICE.

SOLOMON WEINBERG, OF PHILADELPHIA, PENNSYLVANIA, ASSIGNOR OF ONE-HALF TO OSCAR ROSENBAUM, OF PHILADELPHIA, PENNSYLVANIA.

APPARATUS FOR MAKING GRAPE-JUICE.

1,196,621.      Specification of Letters Patent.      Patented Aug. 29, 1916.

Application filed January 26, 1916. Serial No. 74,483.

*To all whom it may concern:*

Be it known that I, SOLOMON WEINBERG, a citizen of the United States, residing at Philadelphia, in the county of Philadelphia and State of Pennsylvania, have invented new and useful Improvements in Apparatus for Making Grape-Juice, of which the following is a specification.

This invention consists in a method and apparatus for making grape juice and it has for its primary object to increase the rapidity in which the grape juice can be made and to prevent the juice extracting agent from coming in direct contact with the grapes.

An object of the invention is to provide an apparatus by means of which pure grape juice can be obtained and to prevent solid matter from entering the fluid.

Another object of the invention is to provide an apparatus in which the parts are so constructed and arranged so as to be readily removed for cleaning purposes and for removing the grape juice and the residue.

With these and other objects in view the invention consists in the construction, combination and arrangement of parts as will be hereinafter more fully described, illustrated in the accompanying drawing and pointed out in the claim hereunto appended.

In the drawing: Figure 1 is a vertical section through the apparatus, Fig. 2 is a horizontal section on line 2—2 of Fig. 1, and Fig. 3 is a detailed sectional view through a portion of my invention.

Referring to the drawing the numeral 1 designates a tank having a flat bottom 2 by means of which the tank may be supported upon any suitable form of heater. The tank 1 is provided with a lid 3 by means of which access may be had to the interior of the tank and also to remove the inner parts now to be described.

A receptacle 4 is spaced from the entire inner surface of the tank by means of the legs 5 so as to leave a space between the receptacle 4 and the tank 1 for the purpose of receiving a quantity of water or other fluid. Rigidly holding the receptacle 4 against movement within the tank and to also allow communication between the receptacle and the exterior of the tank 1, is a spigot 6 illustrated more clearly in Fig. 3 of the drawing wherein it will be seen that the spigot 6 is composed of two members, 7 and 8, the former being rigidly secured to the receptacle and having a tapering outline while the latter is provided with a bore 9 tapering for a portion of its length so as to engage the tapering surface of the member 7. The member 6 has screw-threaded engagement with the tank so as to be brought into engagement or out of engagement with the member 7 with the result that the receptacle will be rigidly held against movement or allowed to be removed from the tank when the member 6 is unscrewed from the tank. Formed within the receptacle 4 in any suitable manner is a perforated receptacle 10 that receives the grapes and holds them in spaced relation to the interior surface of the receptacle 4.

From the foregoing description it will be seen that in the use of the apparatus the grapes arranged in the receptacle 10 will be subjected to the heat from the heating fluid between the receptacle 4 and the walls of the tank 1. This heat is conducted to the grapes and will cause the temperature thereof to increase with the result that the grape skins will burst and the cells of the pulp be broken down so as to allow the juice contained therein to run out and percolate through the grapes and the openings in the receptacle 10 to the receptacle 4. Thus it will be seen that the juice is effectively withdrawn from the fruit while the residue is retained within the receptacle 10 so that the same can be readily removed for making preserves or any other suitable article, while the pure grape juice can be removed by the spigot 6.

It is to be understood that while all the several features of my improved apparatus have special coöperation with one another and together constitute a particularly effective mechanism for the purpose in view, certain of these features may be applied in other relations and I therefore desire to cover the combination present in the several parts of my apparatus whether employed in the general organization shown or elsewhere and I also wish it to be understood that it is not absolutely necessary that a liquid be arranged in the tank 1 as the heating of the air within the tank 1 may be relied on to convey the proper amount of heat to the receptacle 10 in view of the fact that the tank is practically air tight.

What I claim is:

An apparatus of the class described comprising a tank, a receptacle mounted within and spaced from the walls of said tank, and a two part spigot, one part tapering and rigidly secured to said receptacle and the other part screw threaded in the said tank and having a tapering passage the wall of which is adapted to engage the first part.

In testimony whereof I affix my signature in presence of two witnesses.

SOLOMON WEINBERG.

Witnesses:
 IDA WEINBERG,
 OSCAR ROSENBAUM.